US 6,651,138 B2

(12) United States Patent
Lai et al.

(10) Patent No.: US 6,651,138 B2
(45) Date of Patent: Nov. 18, 2003

(54) HOT-PLUG MEMORY CATRIDGE POWER CONTROL LOGIC

(75) Inventors: Ho M. Lai, Cypress, TX (US); John M. MacLaren, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 347 days.

(21) Appl. No.: 09/770,101

(22) Filed: Jan. 25, 2001

(65) Prior Publication Data

US 2002/0002690 A1 Jan. 3, 2002

Related U.S. Application Data

(60) Provisional application No. 60/178,417, filed on Jan. 27, 2000.

(51) Int. Cl.⁷ .............................................. G06F 12/16
(52) U.S. Cl. .................. 711/115; 711/157; 711/114; 710/302; 714/6
(58) Field of Search .............................. 711/115, 157, 711/114; 710/302; 714/799, 6

(56) References Cited

U.S. PATENT DOCUMENTS

| 5,313,626 | A | | 5/1994 | Jones et al. ................. 395/575 |
| 5,331,646 | A | | 7/1994 | Krueger et al. ............. 371/40.1 |
| 5,367,669 | A | | 11/1994 | Holland et al. ............. 395/575 |
| 5,572,395 | A | * | 11/1996 | Rasums et al. ............... 361/58 |
| 6,098,132 | A | | 8/2000 | Olarig et al. ................ 710/103 |
| 6,223,301 | B1 | | 4/2001 | Santeler et al. ................ 714/6 |
| 6,434,652 | B1 | * | 8/2002 | Bailis et al. ................ 710/302 |

FOREIGN PATENT DOCUMENTS

| EP | 0398188 | * | 5/1990 | ............ G11C/5/00 |
| JP | 09222940 | * | 8/1997 | ............ G06F/3/00 |

* cited by examiner

*Primary Examiner*—Mano Padmanabhan
*Assistant Examiner*—Paul A Baker

(57) ABSTRACT

A hot-pluggable memory cartridge for use in a redundant memory system. More specifically, the control logic and method for implementing a plurality of memory cartridges which may be hot-plugged into a memory sub-system.

49 Claims, 11 Drawing Sheets

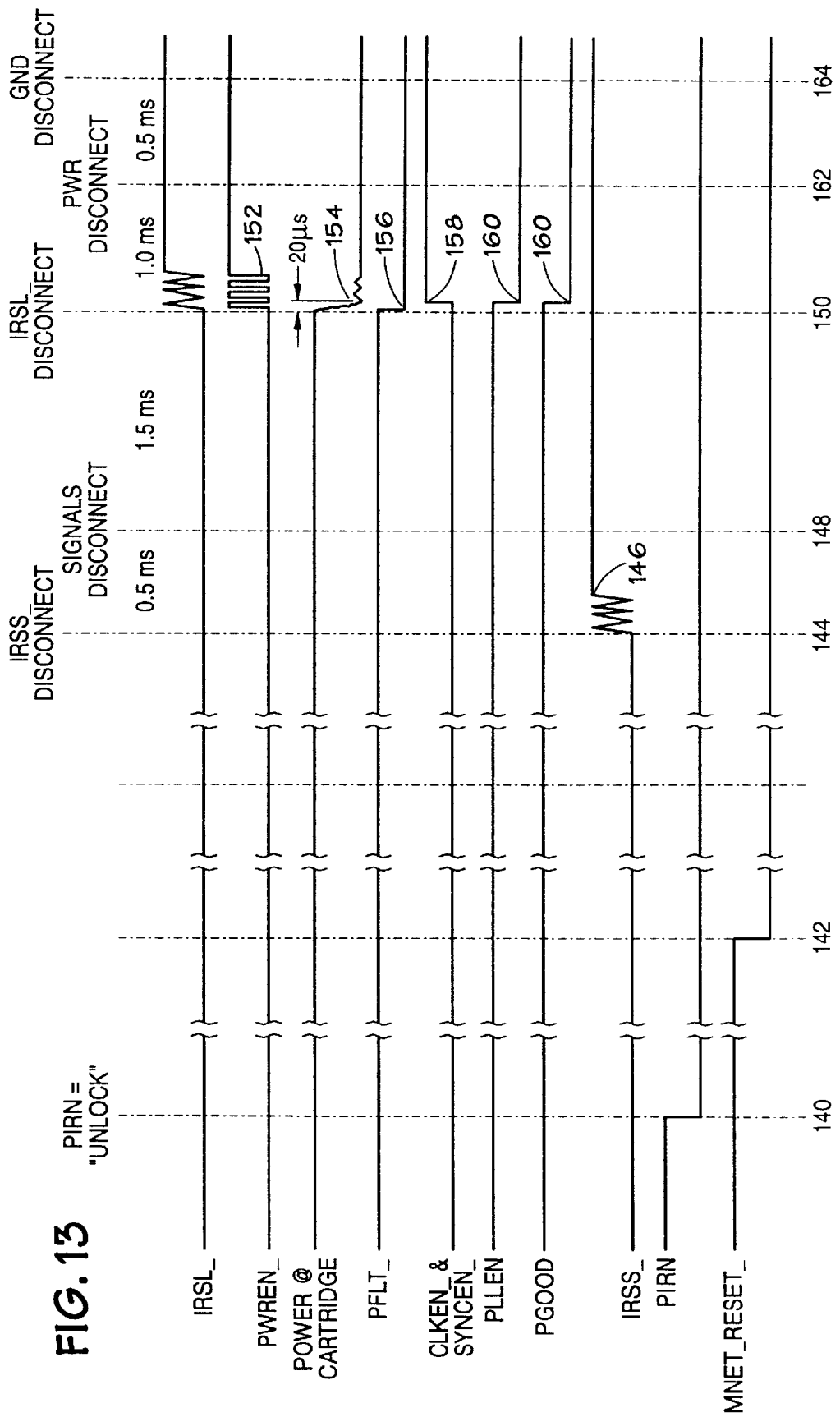

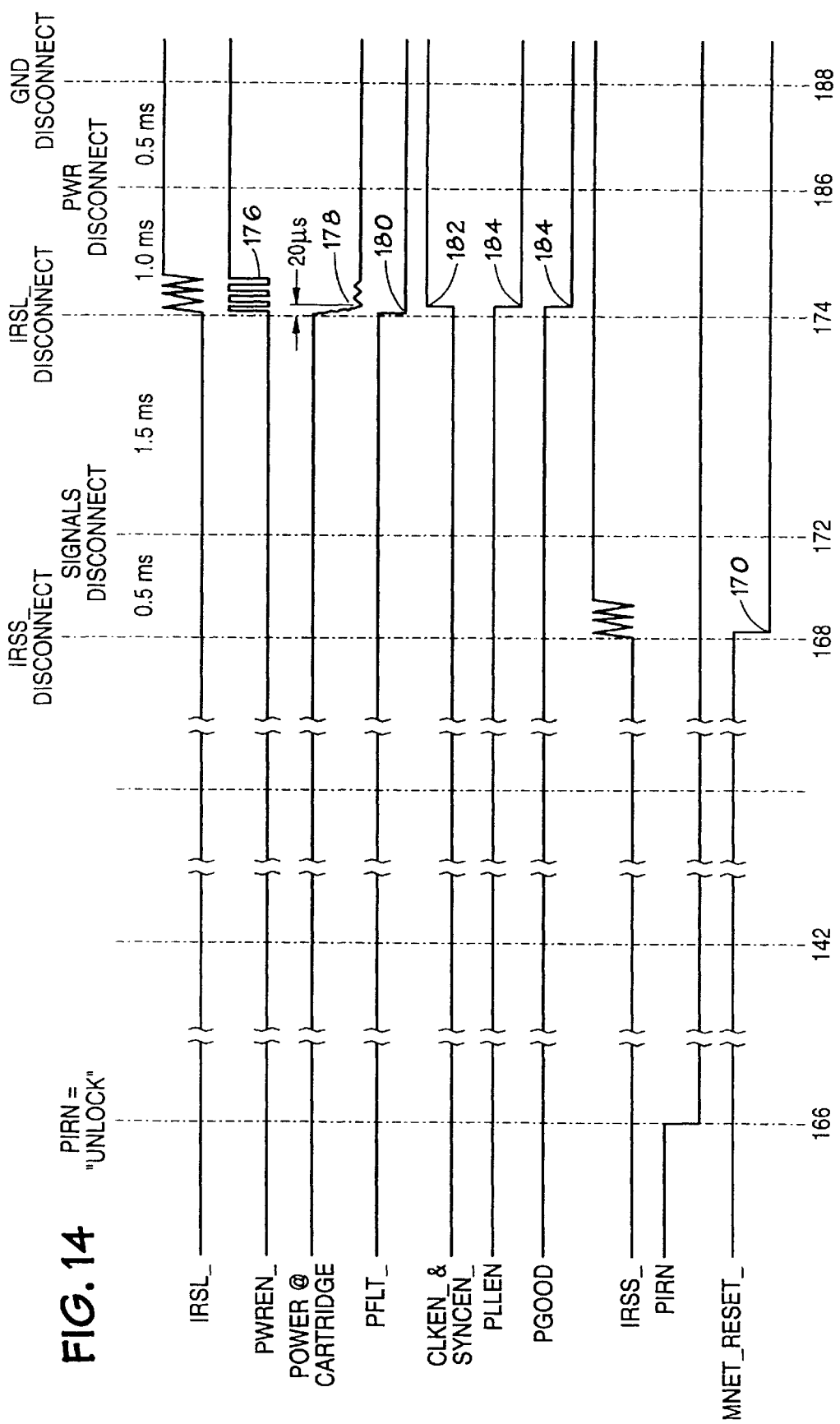

ial application Ser. No. 60/178,417 filed on Jan. 27, 2000.

HOT-PLUG MEMORY CATRIDGE POWER CONTROL LOGIC

CROSS-REFERENCE TO RELATED APPLICATION

The present application claims priority under 35 U.S.C §119(e) to provisional application Ser. No. 60/178,417 filed on Jan. 27, 2000.

BACKGROUND OF THE INVENTION

1. Field of the Invention

The present invention relates generally to hot-pluggable redundant memory systems, and more particularly to the control logic for hot-pluggable redundant memory systems.

2. Description of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Microprocessor-based systems generally incorporate a plurality of electrical components. Electrical components, such as control chips, processor chips and memory modules, are often mounted on a substrate such as a printed circuit board or a ceramic board. The substrates generally contain conductive traces which allow the electrical components to be electrically coupled to each other via the substrate. Aside from connecting the electrical devices to one another, the substrate often provides a means of routing electrical signals to and from the components on the substrate to other substrates or external components of the system.

For example, a computer system may include dozens of electrical devices, including memory devices. Several memory devices may be disposed on a single printed circuit board thereby creating a memory module such as a Dual Inline Memory Module (DIMM). An array of DIMMs may be electrically coupled to another printed circuit board to create a memory cartridge. A memory cartridge may include a control device to control access to and from the memory devices on the memory cartridge.

A computer system which implements a redundant memory system may include several memory cartridges. Occasionally, when a system is running, one or more of the memory cartridges may fail. Fault tolerant system designs may be particularly advantageous in a computer system. When an uncorrectable fault is detected in a memory device, it may be desirable to change the faulty memory cartridge. Further, it may be desirable to change the memory cartridge without powering down the entire system or disrupting normal operations. However, replacing the bad memory cartridge often requires powering the system down. Additional hurdles are introduced when the memory system is a redundant memory system. Replacing memory cartridges in a redundant memory system while the system is still functioning creates various control issues which may be addressed using a control logic scheme to provide a hot-pluggable redundant memory system.

The present invention may address one or more of the problems set forth above.

BRIEF DESCRIPTION OF THE DRAWINGS

The foregoing and other advantages of the invention will become apparent upon reading the following detailed description and upon reference to the drawings in which:

FIG. 13 is a timing diagram illustrating the sequence of events during the normal removal of a memory cartridge from the memory sub-system, in accordance with the present technique; and FIG. 14 is a timing diagram illustrating the sequence of events during an illegal removal of a memory cartridge from the memory sub-system, in accordance with the present technique.

DETAILED DESCRIPTION OF SPECIFIC EMBODIMENTS

One or more specific embodiments of the present invention will be described below. In an effort to provide a concise description of these embodiments, not all features of an actual implementation may be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
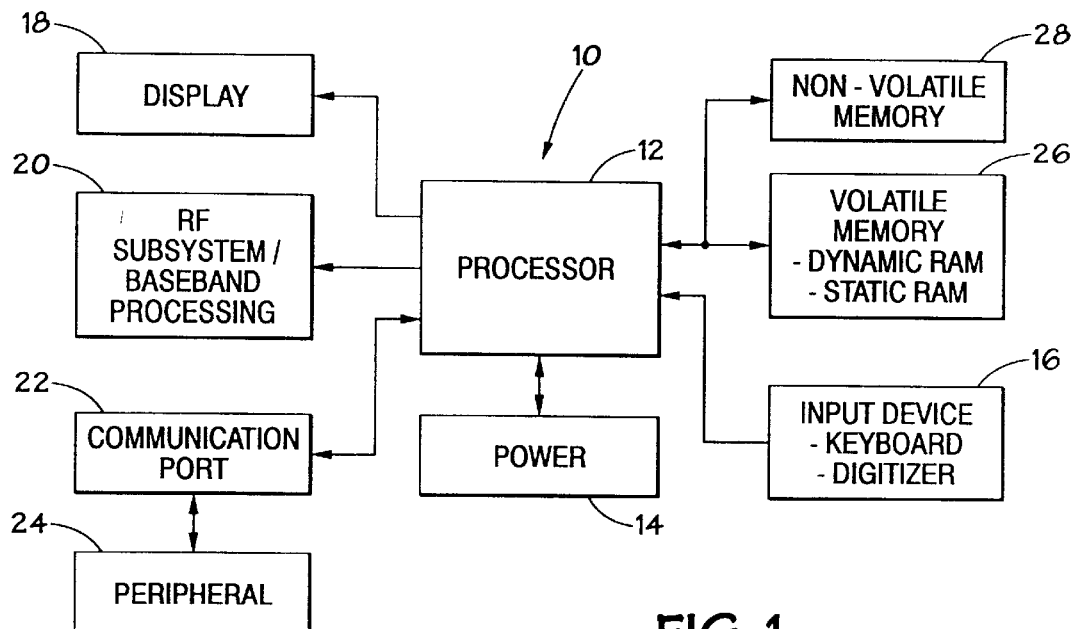
FIG. 1 illustrates a block diagram of an exemplary processor-based system in accordance with the present invention.

Turning now to the drawings, and referring initially to FIG. 1, a block diagram depicting an exemplary processor-based system, generally designated by the reference numeral 10, is illustrated. The system 10 may be any of a variety of different types, such as a computer, pager, cellular telephone, personal organizer, control circuit, etc. In a typical processor-based system, a processor 12, such as a microprocessor, controls many of the functions of the system 10.

The system 10 typically includes a power supply 14. For instance, if the system 10 is portable, the power supply 14 would advantageously include permanent batteries, replaceable batteries, and/or rechargeable batteries. The power supply 14 may also include an A/C adapter, so that the device may be plugged into a wall outlet, for instance. In fact, the power supply 14 may also include a D/C adapter, so that the system 10 may be plugged into a vehicle's cigarette lighter, for instance.

Various other devices may be coupled to the processor 12, depending upon the functions that the system 10 performs. For instance, a user interface 16 may be coupled to the processor 12. The user interface 16 may include buttons, switches, a keyboard, a light pin, a mouse, and/or a voice recognition system, for instance. A display 18 may also be coupled to the processor 12. The display 18 may include an LCD display, a CRT, LEDs, and/or an audio display. Furthermore, an RF sub-system/baseband processor 20 may also be coupled to the processor 12. The RF sub-system/baseband processor 20 may include an antenna that is coupled to an RF receiver and to an RF transmitter (not shown). A communications port 22 may also be coupled to the processor 12. The communications port 22 may be adapted to be coupled to a peripheral device 24, such as a modem, a printer, or a computer, for instance, or to a network, such as a local area network or the Internet.

Because the processor 12 controls the functioning of the system 10 generally under the control of software programming, memory is coupled to the processor 12 to store and facilitate execution of the program. For instance, the processor 12 may be coupled to volatile memory 26, which may include dynamic random access memory (DRAM) and/or static random access memory (SRAM). The processor 12 may also be coupled to non-volatile memory 28. The non-volatile memory 28 may include a read only memory (ROM), such as an EPROM or Flash-Memory, to be used in conjunction with the volatile memory. The size of the ROM is typically selected to be just large enough to store any necessary operating system, application programs, and fixed data. The volatile memory, on the other hand, is typically quite large so that it can store dynamically loaded applications. Additionally, the non-volatile memory 28 may include a high capacity memory such as a disk or tape drive memory.

A variety of memory devices, such as DRAMS, SDRAMS, SRAMS, etc., can make up the volatile memory 26, and may be utilized in a system such as a computer system. Several memory devices may be coupled on a substrate or PCB to provide a single memory module, such as a SIMM or DIMM. A plurality of DIMMs may be coupled to a substrate or PCB board to form a replaceable memory cartridge. An exemplary fault tolerant memory scheme that may be implemented in a computer system incorporates a plurality of memory cartridges to provide a memory array for the computer system. The organizational scheme of the memory array may be referred to as a Redundant Array of Industry Standard DIMMs (RAID). One particular implementation of the RAID scheme involves a parity-based RAID scheme. In this scheme, the data which is stored in memory is distributed across the array in bit groups known as data "words." As words are stored in the array, a parity word is also generated from the data. The parity word may be used to recover lost or corrupted data words. In an exemplary system, four memory cartridges may be used to store data while a fifth memory cartridge is used for parity storage. If an error is detected in any one of the four data words stored in one of the four memory cartridges, the data word can be recreated using the parity word stored in the fifth memory cartridge. Similarly, if an error is detected in a parity word, the parity word can be recreated using the four data words. By using the present RAID memory architecture, there is provided a system that not only detects and corrects multi-bit errors easily, but also provides a system in which memory cartridges can be removed and or replaced while the system is running (i.e., the memory cartridge is hot-pluggable).

Figure 2:
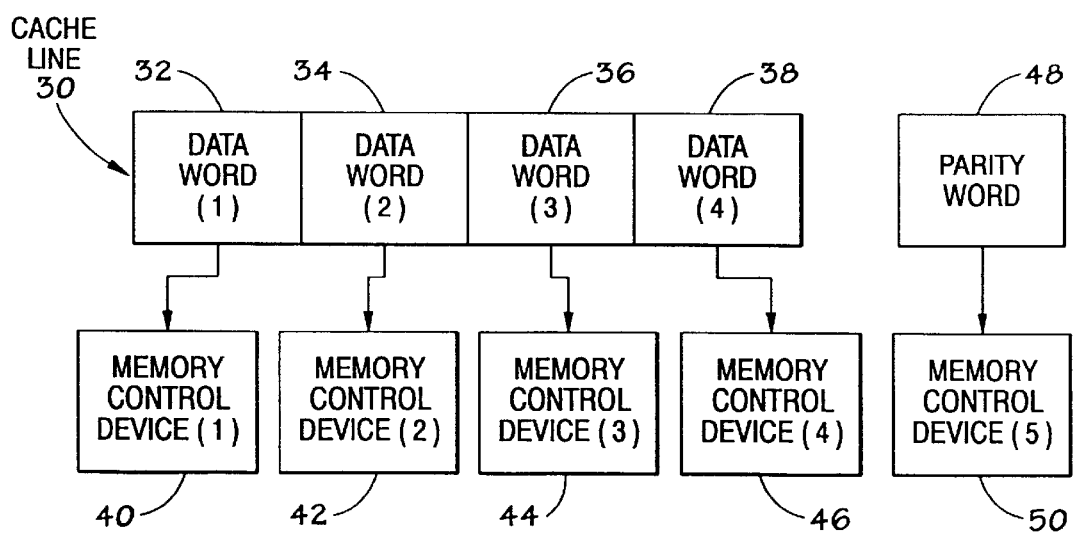
FIG. 2 generally illustrates a cache line and a memory control device configuration in a redundant memory system.

FIG. 2 illustrates how a redundant RAID memory system works. RAID memory stripes a cache line of data 30 such that data words 32, 34, 36, and 38 are distributed across four memory cartridges (illustrated in FIG. 4) for data storage. Each data word 32, 34, 36, and 38 is transmitted to the memory devices through individual memory control devices 40, 42, 44, and 46, respectively. Each of the memory control devices 40, 42, 44, and 46 reside on a separate memory cartridge. A fifth parity data word 48 is generated from the original cache line 30. Each parity word 48 is also transmitted through a separate memory control device 50 located on a fifth memory cartridge. The generation of the parity data word 48 from the original cache line 30 of data words 32, 34, 36, and 38 can be illustrated by way of example. For simplicity, four-bit data words are illustrated. However, it should be understood that these principles are applicable to data words of any useful bit length. Consider the following four data words:

| DATA WORD 1: | 1011 |
| DATA WORD 2: | 0010 |
| DATA WORD 3: | 1001 |
| DATA WORD 4: | 0111 |

A parity word can be either even or odd. To create an even parity word, common bits are simply added together. If the sum of the common bits is odd, a "1" is placed in the common bit location of the parity word. Conversely, if the sum of the bits is even, a "0" is placed in the common bit location of the parity word. In the present example, the bits may be summed as follows:

| DATA WORD 1: | 1011 |
| DATA WORD 2: | 0010 |
| DATA WORD 3: | 1001 |
| DATA WORD 4: | 0111 |
| | 2133 |
| PARITY WORD: | 0111 |

When summed with the four exemplary data words, the parity word 0111 will provide an even number of active bits (or "1's") in every common bit location. This parity word can be used to recreate any of the data words (1–4) if a correctable data error is detected in one of the data words, as further explained with reference to FIG. 3.

Figure 3:
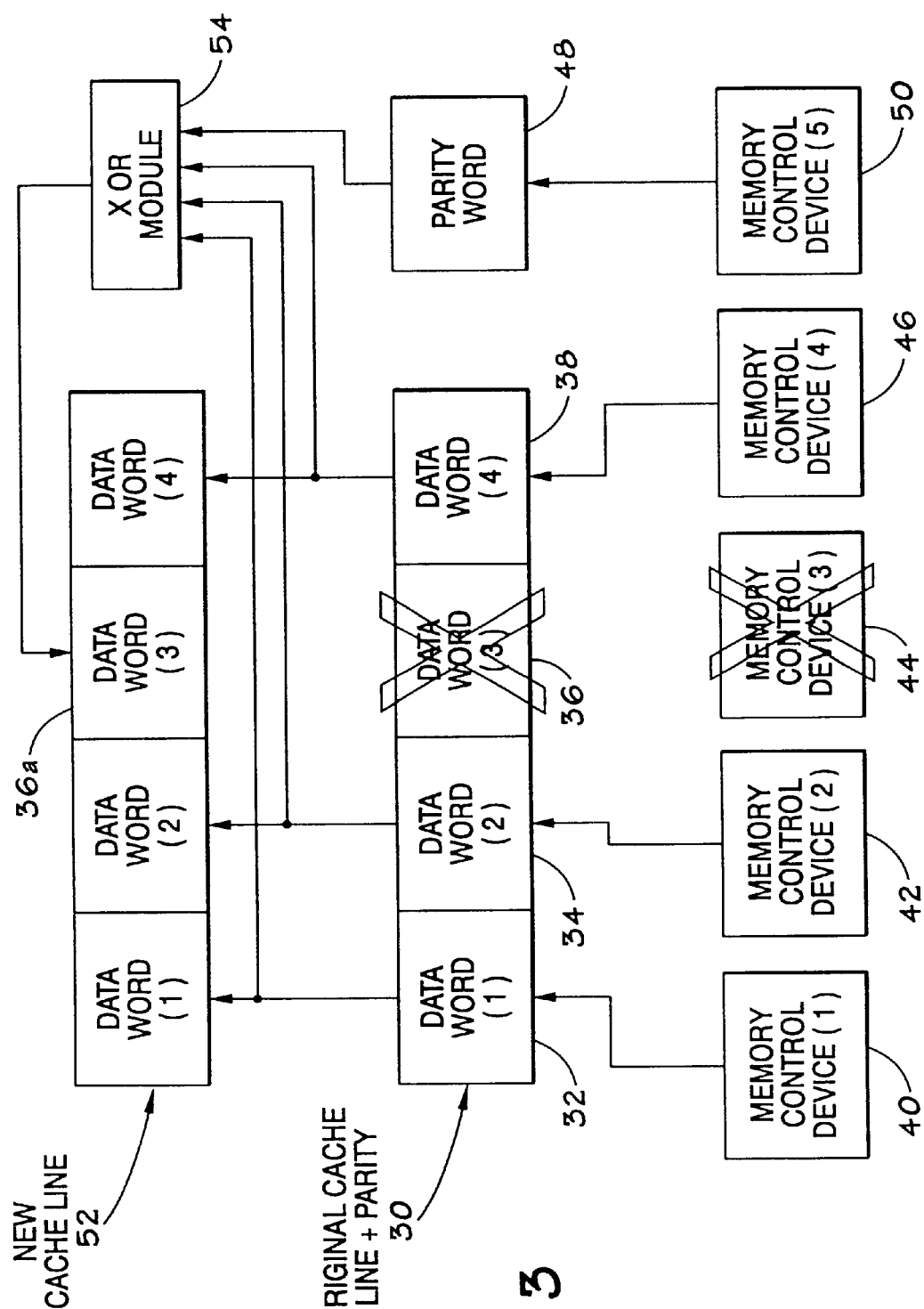
FIG. 3 generally illustrates the implementation of a redundant RAID memory system.

FIG. 3 illustrates the recreation of a data word in which a correctable error has been detected in a RAID memory system. As in FIG. 2, the original cache line 30 comprises four data words 32, 34, 36, and 38 and a parity word 48. Further, the memory control devices 40, 42, 44, 46, and 50 corresponding to each of the data words and parity word, are illustrated. In this example, a data error has been detected in the data word 36. A new cache line 52 can be created using data words 32, 34, and 38 along with the parity word 48 using an exclusive-OR (XOR) module 54. By combining each data word 32, 34, 38, and the parity word 48 in the XOR module 54, the data word 36 can be recreated. A new and correct cache line 52 thus comprises data words 32, 34, and 38 copied directly from the original cache line 30 and data word 36*a* (which is the recreated data word 36) which is produced by the XOR module 54 using the error free data words 32, 34, and 38 along with the parity word 48. It should also be clear that the same process may be used to recreate the parity word 48 if an error is detected therein.

Similarly, if the memory controller 44, which is associated with data word 36, is removed during operation (i.e., hot-plugged) the data word 36 can similarly be recreated. Thus, any single memory control device (in this example, memory control device 44) can be removed while the system is running and the data can be recreated using the other four memory control devices (memory control devices 40, 42, 46 and 50) and the XOR module 54. This may be particularly useful if uncorrectable errors are found in any of the memory devices on a memory cartridge or in the memory control device located on the memory cartridge. If a cartridge is removed from the system, the system transitions from a redundant mode of operation to a non-redundant mode of operation. The transition of the memory system from a redundant mode of operation to a non-redundant mode of operation and vice versa requires control logic to bring new memory cartridges on and off-line during hot-plug operations and fault isolation. The control logic will handle the transition during memory hot-plug operations and maximize system availability by detecting memory faults which require a memory cartridge to be taken off-line so that the integrity of the system is not compromised. The system may continue to operate in a non-redundant mode.

Figure 4:
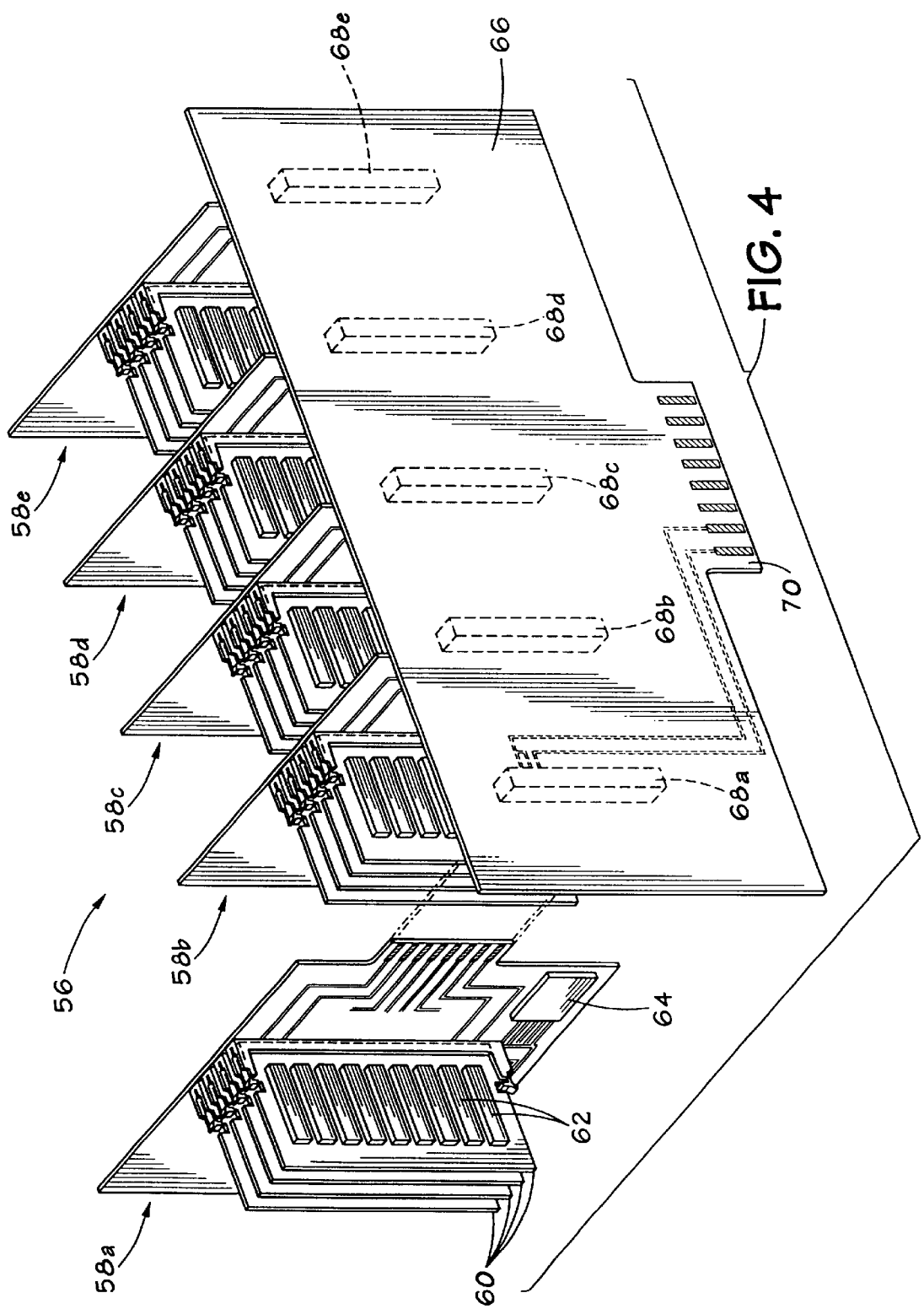
FIG. 4 illustrates one embodiment of a redundant memory sub-system.

FIG. 4 illustrates one embodiment of a redundant memory sub-system 56. The memory sub-system 56 comprises five memory cartridges 58*a–e*. Memory cartridge 58*e*, for example, may be used for parity storage. The memory cartridge 58*a* includes four DIMMs 60 mounted thereon. Each DIMM 60 includes a plurality of memory devices such as DRAMs 62. Further, the memory cartridge 58*a* has a memory control device 64 mounted thereon. It should be understood that each memory cartridge 58*a* includes a plurality of DIMMs 60 and a corresponding memory control device 64. The memory cartridges 58*a–e* may be mounted on a memory system board 66 via cartridge connectors 68*a–e*. The memory sub-system 56 can be incorporated into a computer system via an edge connector 70 or by any suitable means of providing a data path from the computer system to the DRAMs 62. It should be evident that each of the memory cartridges 58*a–e* may be removed (hot-plugged) from the memory sub-system 56. By removing a memory cartridge, such as memory cartridge 58*a*, from the memory sub-system 56, the computer system will transition from a redundant mode of operation (implementing the fifth memory cartridge 58*a*) to a non-redundant state (implementing only four memory cartridges). When transitioning from a redundant to a non-redundant mode of operation during a hot-plug memory event, it may be advantageous to provide control logic to gracefully handle the insertion or removal of a memory cartridge 58*a–e*.

Figure 5:
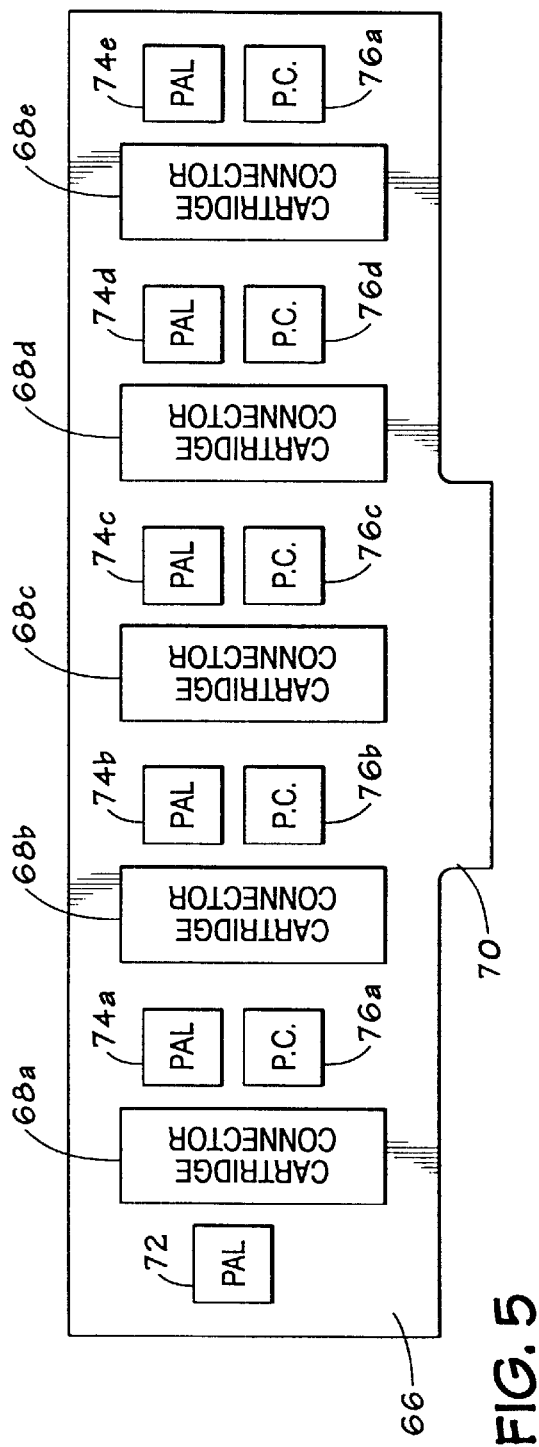
FIG. 5 illustrates a block diagram of a redundant memory system board.

FIG. 5 illustrates a block diagram of a memory system board 66 including a plurality of control devices which may be implemented in the present system. As illustrated previously in FIG. 4, the memory system board 66 may include an edge connector 70 to incorporate the memory board 66 into a computer system. The memory system board 66 includes cartridge connectors 68*a–e* for attaching memory cartridges 58*a–e* (FIG. 4) to the memory system board 66. The logic controls on the memory system board 66 may include a system PAL 72 to facilitate the exchange of certain detection and fault signals. Further, the memory board 66 may include cartridge PALs 74*a–e*. Each cartridge PAL 74*a–e* may facilitate the exchange of certain control signals between a memory cartridge 58*a–e* and the memory system board 66. Further, each memory cartridge 58*a–e* may include an associated power controller 76*a–e* mounted on the memory system board 66 to prevent over-current faults which may be associated with the insertion of the memory cartridge 58*a–e*. Other components, such as error detection LEDs or other logical devices designed for control or error detection/correction may also reside on the memory system board 66. The control logic (system PAL 72, cartridge PALs 74*a–e*, and power controllers 76*a–e*) controls bringing the memory cartridges 58*a–e* on an off-line during hot-plug operation and fault condition detection. During a hot-plug operation, the control logic supplies power to the memory cartridges 58*a–e* in a manner that protects the hardware and according to a power sequence protocol. If a fault condition is detected, the control logic will take the affected memory cartridge off-line. Once the affected memory cartridge is taken off-line, the system may continue to operate in a non-redundant mode.

The control logic facilitates control over the memory sub-system 56 in a variety of scenarios. First, the power controllers 76*a–e* can detect under-voltage and over-current faults. This is most likely to occur during a hot-plug event, but it may occur at any time that the system is operational. Also, if an uncorrectable error occurs in one of the memory cartridges 58*a–e* and the memory cartridge 58*a–e* is replaced during a hot-plug operation, the power controllers 76*a–e* power down on a hot-remove and power up on a hot-insert to properly control power to the memory cartridges 58*a–e* to meet associated electrical requirements and power sequence protocol. The present control logic is also useful in protecting the memory sub-system 56 during an illegal power down operation. If an operator removes a memory cartridge in a way that violates the memory system protocol and endangers data integrity, the control logic may power down the entire memory sub-system 56 to prevent system damage.

The hot-plug circuitry and control logic for the present system and for each memory cartridge 58 includes a cartridge connector 68, a system PAL 72, a cartridge PAL 74, and a power controller 76. As indicated in FIG. 5, the memory sub-system 56 generally includes five memory cartridges 58*a–e*, five cartridge connectors 68*a–e*, five cartridge PALs 74*a–e*, and five power controllers 76*a–e*. The system PAL 72 is implemented for use by each memory cartridge. For simplicity, the alpha-characters have been removed from each reference numeral (e.g., memory cartridges 58*a–e* are depicted as memory cartridge 58) in the description of FIGS. 6–9. It should be understood that the detailed description applies to each memory cartridge 58*a–e* and its associated components. FIGS. 6–9 describe one embodiment of each of the components of the present system.

Figure 6:
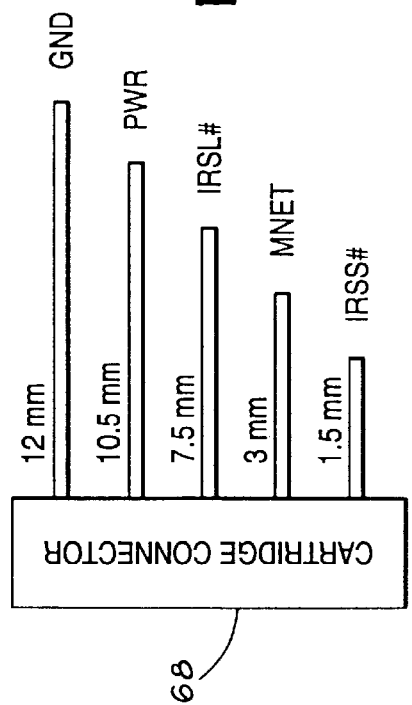
FIG. 6 illustrates one embodiment of a memory cartridge connector in accordance with the present system.

FIG. 6 illustrates one embodiment of a cartridge connector 68. Each cartridge connector 68 may include a plurality of signal pins (e.g., 120 pins). To implement the present system, signal pins and power pins may be of varying lengths. By varying the pin lengths in the cartridge connector 68, the sequence of events during the insertion or removal of a memory cartridge 58 can be controlled, as will be further discussed with reference to FIG. 10–12. In one embodiment, the ground pin GND may be 12 mm, for example. Because the ground pin GND is the longest pin in the cartridge connector 68, during insertion of a memory cartridge 58, the ground signal GND will be established first. This establishes a solid ground for the memory cartridge. Next, a power pin PWR may be 10.5 mm, for example. During insertion, the power pin PWR will be connected after the ground pin GND. However, the cartridge 58 does not power up until the insertion/removal sense long pin (IRSL#), which may be 7.5 mm, is connected. Next, the signal pins NMNT, which may be 3 mm, are connected. Finally, the insertion/removal sense short pin (IRSS#) is connected. Since the IRSS# pin is the shortest pin in the cartridge connector 68, once the IRSS# is connected this indicates that the memory cartridge 58 is fully inserted in the cartridge connector 68.

To implement the present system, software drivers must be loaded on the host computer system to appropriately initialize and drive the memory sub-system 56. During a memory cartridge insertion, certain data, such as Present Detect Signals, Power Fault signals, and Pre-Insertion Removal Notification Cable detect signals (PIRN_CABLE) may be input into the system PAL 72. The Present Detect signals, Power Fault signals, and PIRN_CABLE signal, are shifted into a host controller on the host computer system (not shown) by clocking the data bits through the system PAL 72. Once the memory cartridge is inserted into the cartridge connector 68, all of the signals are latched into the registers of the system PAL 72. One bit of data may be shifted to the host controller from the system PAL 72 on each clock cycle. Table 1 indicates the shift-in signals received by the system PAL 72 along with the descriptive functions.

TABLE 1

Shift-in Signals for System PAL

| Signal | Bit | Value=0 | Value=1 |
| --- | --- | --- | --- |
| PU_MRM0_IRSL_ (PD0) | 0 | Memory cartridge 0 installed | Memory cartridge 0 not installed |
| PU_MRM1_IRSL_ (PD1) | 1 | Memory cartridge 1 installed | Memory cartridge 1 not installed |
| PU_MRM2_IRSL_ (PD2) | 2 | Memory cartridge 2 installed | Memory cartridge 2 not installed |
| PU_MRM3_IRSL_ (PD3) | 3 | Memory cartridge 3 installed | Memory cartridge 3 not installed |
| PU_MRM4_IRSL_ (PD4) | 4 | Memory cartridge 4 installed | Memory cartridge 4 not installed |
| PU_MRM0_PFLT_ | 5 | Memory cartridge 0 power at fault | Memory cartridge 0 power OK |
| PU_MRM1_PFLT_ | 6 | Memory cartridge 1 power at fault | Memory cartridge 1 power OK |
| PU_MRM2_PFLT_ | 7 | Memory cartridge 2 power at fault | Memory cartridge 2 power OK |
| PU_MRM3_PFLT_ | 8 | Memory cartridge 3 power at fault | Memory cartridge 3 power OK |
| PU_MRM4_PFLT_ | 9 | Memory cartridge 4 power at fault | Memory cartridge 4 power OK |
| PIRN_CABLE | 15 | PIRN cable not installed | PIRN cable installed |

The Present Detect signals (PD0-4) indicated that a cartridge 58 has been inserted. The Present Detect signals are connected to the IRSL# pins on each of the cartridge connectors 68. The IRSL# pin is also tied to a weak pull-up resistor. Thus, when the memory cartridge 58 is inserted, it will be pulled low. The Power Fault signals are output from the power controllers 76 and indicate if a power fault was detected on one of the memory cartridges 58. It will be asserted or driven low when the power distribution to the memory cartridge 58 is at fault. The PIRN_CABLE signal has a weak pull-down resistor. It is pulled up if the current cable is installed properly.

The system PAL 72 may also provide logic for hardware control of an audio alarm which may be implemented to indicate that a hot-plug driver is not loaded in the system or that a user is attempting to remove any of the five memory cartridges illegally. The PIRN_CABLE signal is a signal associated with a mechanical switch which may be used to lock the memory cartridge 58 in the cartridge connector 68. An audio alarm may be triggered when any of the PIRN switches are turned from the "lock" to "unlock" position. The PIRN signals can be used in the audio alarm.

Figure 7:
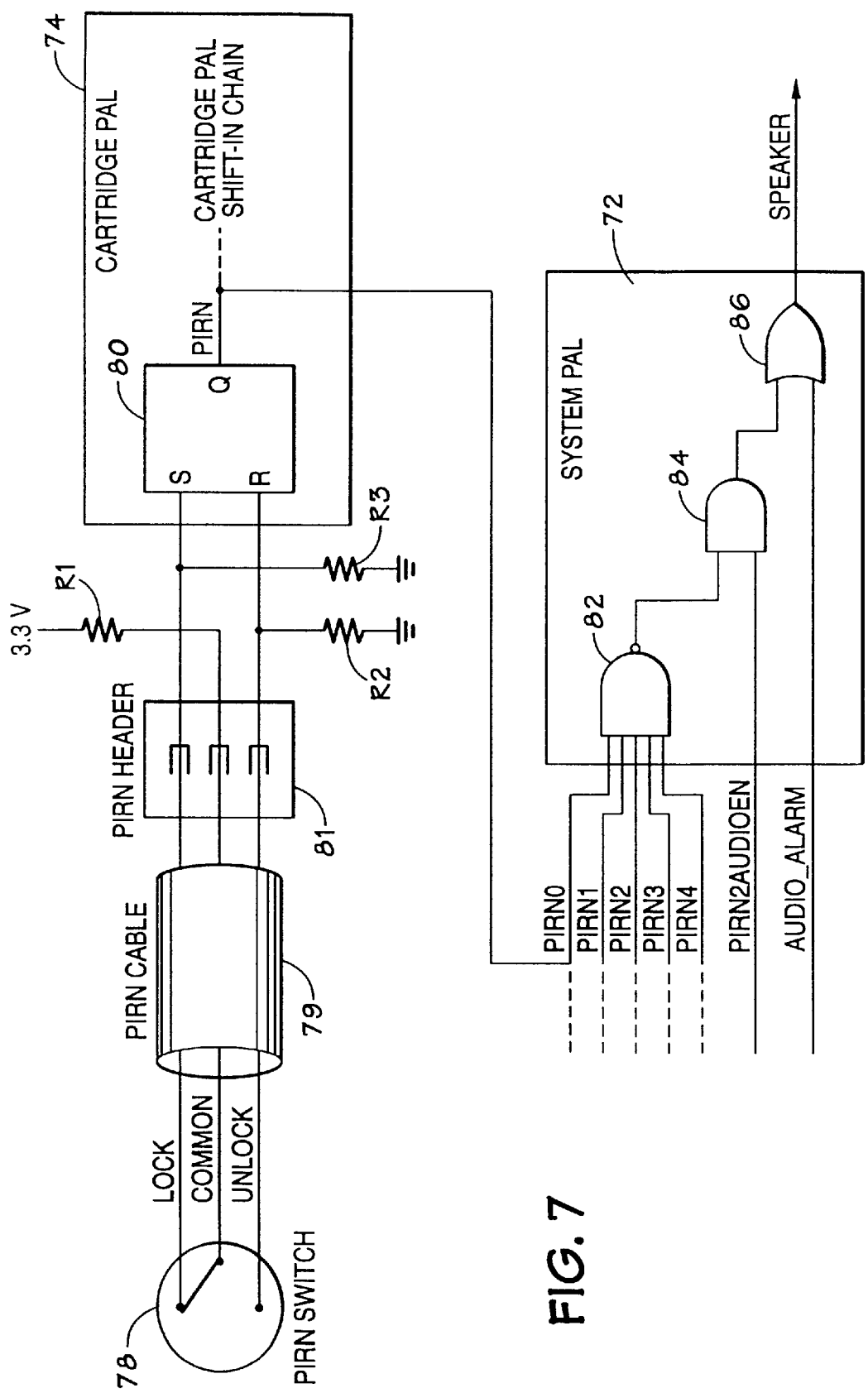
FIG. 7 illustrates a schematic drawing of one configuration of an audio alarm which may be implemented with the present system.

FIG. 7 illustrates one embodiment of an audio alarm associated with the present system. If the PIRN switch 78 is unlocked, the signal will be sent through a cable 79 header connector 81, then to an SR flip-flop 80 located in each cartridge PAL 74. R2 and R3 are weak pull down resistors. Their function is to provide bias for the inputs of the SR flip-flop such that it will not be floating of the PIRN cable is not installed. R1 is a strong pull up resistor, which is connected to the "common" of the PIRN switch. When the PIRN switch is turned to either "lock" or "unlock" position, then either the "S" or "R" input of the flip-flop will be pulled. The PIRN signal (PIRN0-4) from each of the memory cartridges 58 is fed into the input of a NAND gate 82 and the output of the NAND gate 82 may be input into an AND gate 84. If any one of the PIRN switches 78 is unlocked, the output of the NAND gate 82 will be driven logically high. That signal may be combined with another signal from the host controller (PIRN2AUDIOEN) through the AND gate 84. The output of the AND gate 84 can then be combined with an AUDIO_ALARM signal from the host controller using a OR gate 86. The output from the OR gate 86 can be fed directly to the base of a bipolar transistor 87 to turn on an audio speaker 89. By a default setting, the PIRN2AUDIOEN signal is set to "1". Under this setting, the alarm will sound when any PIRN switches 78 are turned to the unlock position. When the hot-plug memory driver is loaded, it will set the PIRN2AUDIOEN signal to "0". With this setting, the alarm can be controlled by the hot-plug memory driver through the AUDIO ALARM bit. To enable hardware support for the audio alarm, the PIRN2AUDIOEN signal should be set to "1". To disable the hardware support for the audio alarm, the PIRN2AUDIOEN signal bit is set to "0". To actually turn the audio alarm on, the AUDIO_ALARM bit is set to "1". To turn the alarm off, the AUDIO_ALARM bit is set to "0". It should be evident that the audio alarm is optional in the present system.

Figure 8A:
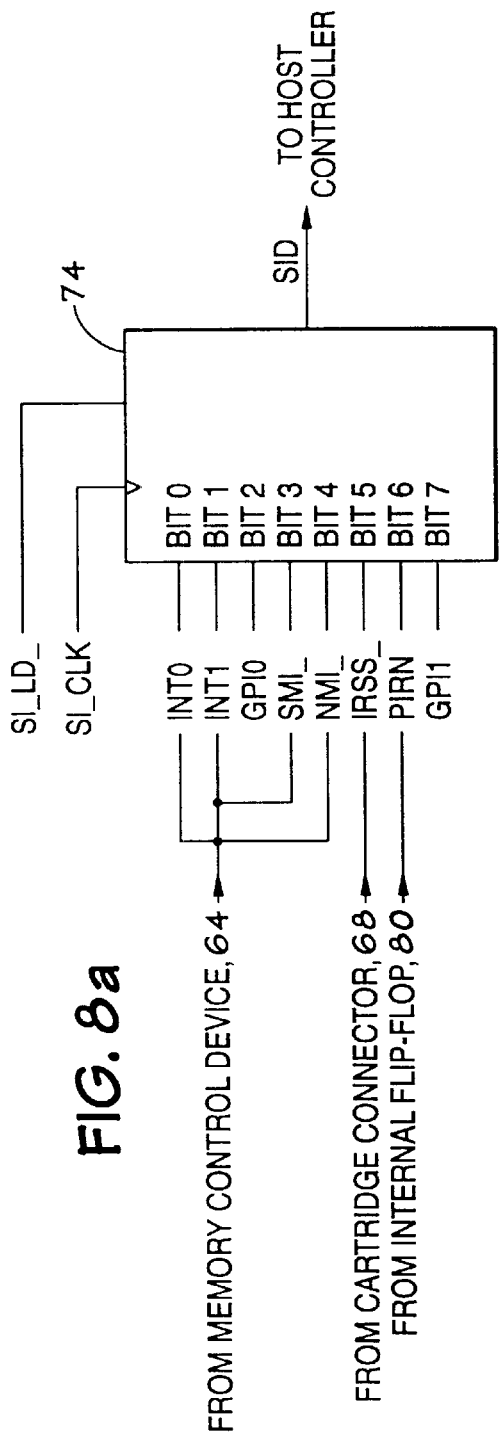
FIGS. 8a and 8b illustrate the shift-in and shift-out chains associated with the cartridge PAL.
Figure 8B:
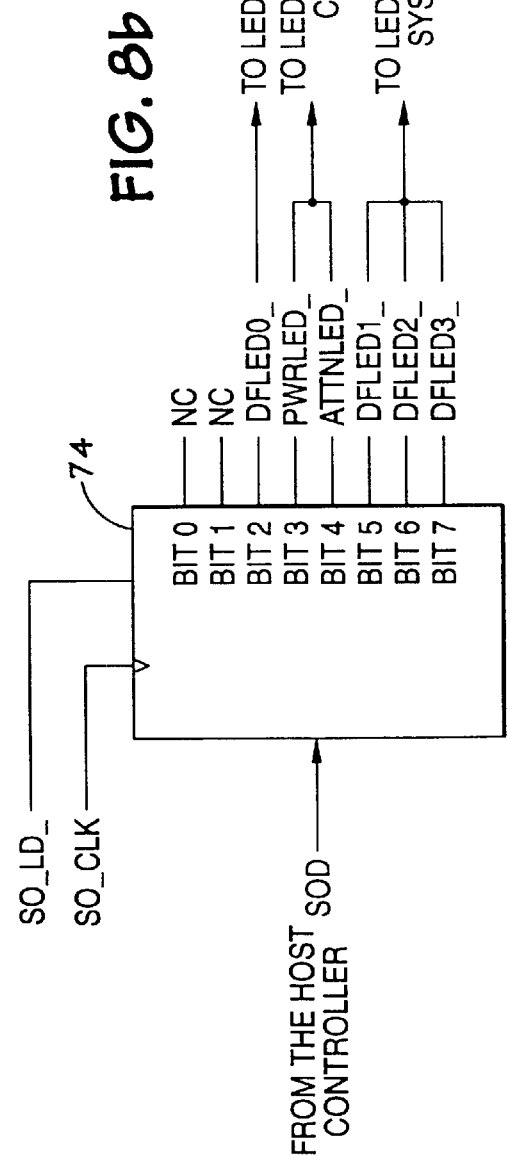

FIGS. 8a and 8b indicate the shift-in and shift-out chains in the cartridge PALs 74. Referring initially to FIG. 8a, the 8-bit shift-in chain is illustrated. The "shift-in chain" refers to the signals which are fed into the cartridge PAL 74. The four interrupt signals, INT0_, INT1_, SMI_, and NMI_ are driven from the memory control device 64 on the memory cartridge 58 to the cartridge PAL 74. The IRSS_ signal is directly connected to the IRSS_pin in the cartridge connector 68. When the hot-plug memory cartridge 58 is installed and fully seated in the cartridge connector 68, the IRSS signal will be asserted (pulled down). The PIRN signal is an output of an internal S-R flip-flop 80, as illustrated in FIG. 7. When the PIRN switch 78 is in the lock position, the PIRN singal will be driven high. When the PIRN switch 78 is in the unlock position, the PIRN signal will be driven low. The remaining bits may receive General Purpose Input signals 0 and 1 (GPI0 and GPI1).

On the falling edge of the SI_LD_signal, each of the input signals will be latched into the registers of the cartridge PAL 74. On each rising edge of the clock signal SI_CLK, the signals will be shifted out through output SID. The output SID may be connected directly to the host controller. By the end of the eighth clock cycle, all eight bits (0–7) will have been shifted to the host controller.

LEDs may be used to indicate various conditions (e.g. errors) of the memory cartridges 58 or the individual DIMMs 60. FIG. 8b illustrates the shift-out chain used in the cartridge PAL 74. Bits 0 and 1 are not connected. The PWRLED_ and ATTNLED_ signals are connected to green power LEDs and amber attention LEDs on each memory cartridge 58. The four DFLED[3:0]_ signals may be connected to four DIMM fault LEDs on the memory system board 66. When a particular DIMM is determined to be at fault (i.e., uncorrectable ECC errors), software loaded on the system will turn on a corresponding LED to alert a user which DIMM is bad. The SOD signal is driven from the host controller on each rising edge of the SO_CLK signal and into the registers of the cartridge PAL 74. After the eighth clock cycle, all eight bits of data will be shifted into the cartridge PAL 74. On the falling edge of the SO_LD_ signal, all eight data bits will be latched and driven out of the cartridge PAL 74.

Figure 9:
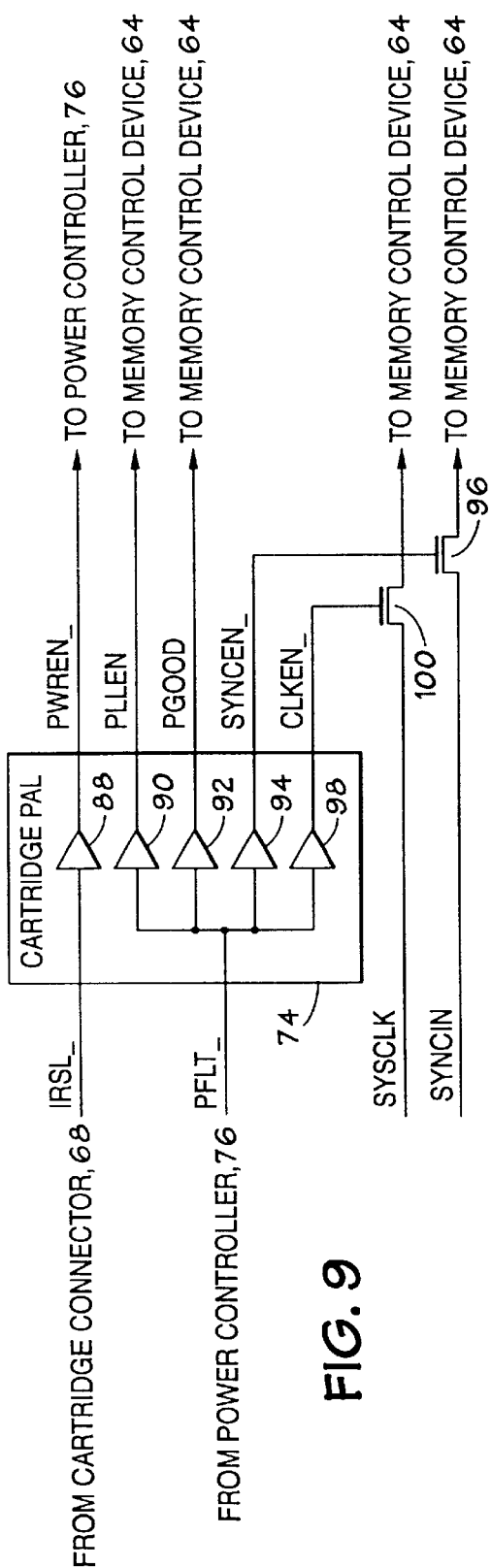
FIG. 9 illustrates a schematic drawing of additional logic corresponding to miscellaneous control signals in the cartridge PAL.

Each cartridge PAL 74 may also provide logic for miscellaneous control signals, as illustrated in FIG. 9. The PWREN_ is a buffered signal of IRSL_ on the cartridge connector 68. When a memory cartridge 58 is inserted into a cartridge connector 68, the IRSL_ signal is asserted and is driven through a latch 88. The output of the latch 88 is the PWREN_ signal which will be asserted to the power controller 76. Since IRSL_ pin is longer than the MNET signal pins, the power controller 76 will be enabled first during insertion of a memory cartridge 58, and disabled last during removal of a memory cartridge 58.

Figure 10:
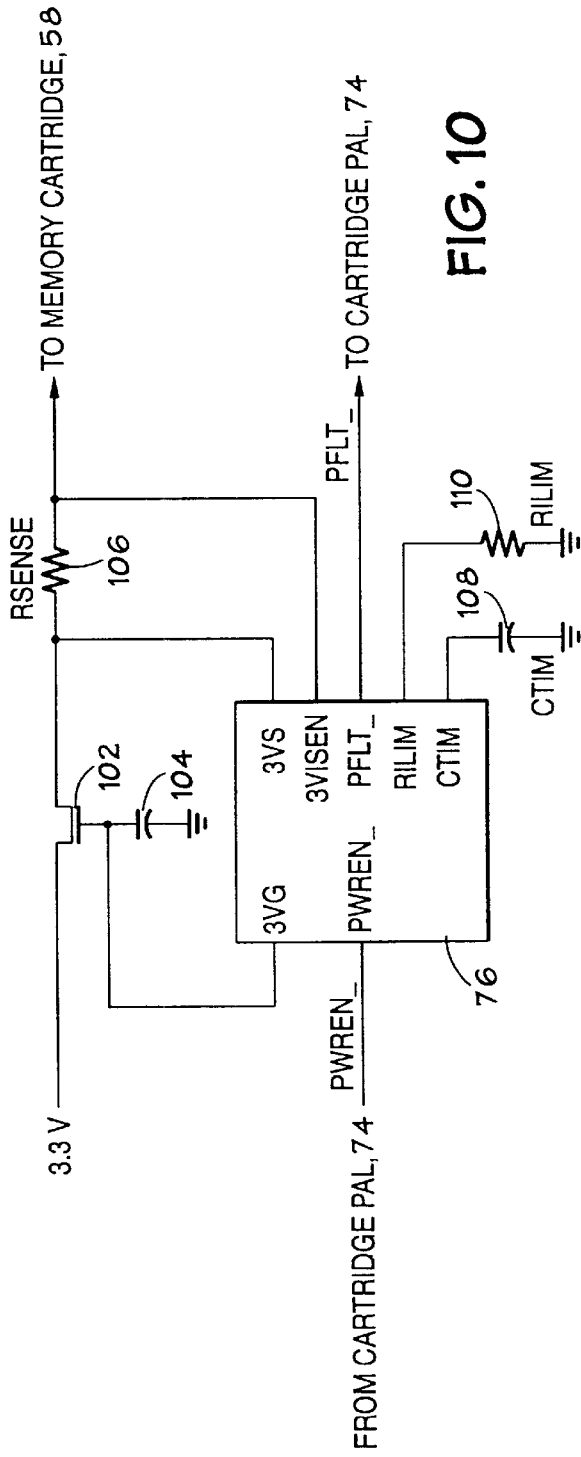
FIG. 10 illustrates one embodiment of a power controller in accordance with the present technique.

The PFLT_ signal is driven out from the power controller 76, as will be illustrated in FIG. 10. When there is a power fault on the memory cartridge 58, such as an over current or under voltage conditions, PFLT_ will be asserted (driven low). When the power on the memory cartridge 58 is within operating condition (i.e. there are no power-fault conditions), PFLT_ will be de-asserted (driven high). The buffered PFLT_ signal produces the remaining control signals discussed below.

The PLLEN signal is produced from the PFLT_ signal, through a latch 90. The PLLEN signal is delivered to the memory control device 64 (FIG. 4) on the memory cartridge 58. The PLLEN signal is used to disable the internal PLLs inside the memory control device 64 when power to the memory cartridge 58 is not within the operating condition.

The PGOOD signal is produced from the PFLT_ signal, through a latch 92. The PGOOD signal is delivered to the memory control device 64 (FIG. 4) on the memory cartridge 58. The PGOOD signal is used to provide a signal to the memory control device 64 indicating that the power is within an acceptable range when the memory cartridge 58 is hot-plugged into the memory system board 66. At this point, the internal registers inside memory control device 64 can be reset to a known state.

The SYNCEN_ signal is produced from the PFLT_ signal, through a latch 94. The SYNCEN_ signal is connected to a quick switch 96. The SYNCEN_ signal is used to enable the SYNCIN signal to the memory control device 64 when the power to the memory cartridge 58 is within the operating condition. Once the SYNCEN_ signal is asserted (upon de-assertion of the PFLT_ signal), the SYNCIN signal will be delivered to the memory control device 64.

The CLKEN_ signal is produced from the PFLT_ signal, through a latch 98. The CLKEN_ signal is connected to a quick switch 100. The CLKEN_ signal is used to enable the SYSCLK signal to the memory control device 64 when the power to the memory cartridge 58 is within the operating condition. Once the CLKEN_ signal is asserted (upon de-assertion of the PFLT_ signal), the SYSCLK signal will be delivered to the memory control device 64.

One embodiment of the power controller 76 is illustrated in FIG. 10. Each power controller provides fault protection to detect under voltage and over-current conditions. Exemplary fault protection capabilities are described below.

The power controller 76 can turn on in a "soft start mode" to protect the supply rail from sudden loading. Upon the assertion of the PWREN_ signal, an internal 10 uA current source is turned on to charge the gate of the MOSFET 102. The gate capacitor 104 creates a programmable ramp (soft-start) to control the inrush currents into the memory cartridge 58. The drain of the MOSFET 102 may be connected to a power supply, such as a 3.3 v power supply. The source of the MOSFET 102 may be connected to a resistor 106.

Over-current (short circuit) protection is facilitated by the RSENSE resistor 106. When the current through the RSENSE resistor 106 exceeds a user programmed over-current value, the power controller 76 enters a current regulation mode. At this time, the time-out capacitor 108 starts charging with a 10 uA current source and the power controller 76 enters the time out period. Once the time-out capacitor 108 charges to a 2V threshold, the MOSFET 102 is latched off. Further, in the event of a fault of at least three times the current limit level (short circuit), the MOSFET 102 is latched off immediately without entering the time out period.

The time-out capacitor (CTIM) 108 sets the time out period. The time out period is the time between the onset of over current limit and chip shutdown. The duration of the time out period is given by the following equation:

$$\text{Time out period (sec.)} = 200K \, \text{Ohm} * CTIM$$

Thus, for CTIM=0.022 uF, the time out period will be 4.4 msec.

The power controller 76 also provides for under-voltage protection. When the load voltage as sensed by 3VISEN is below the under voltage threshold, typically around 2.80V, the PFLT_ signal will be asserted, thereby indicating that a power fault has been detected. The power fault signal PFLT_ will be asserted when either the over current (OC) or the under voltage (UV) conditions occur. The PFLT_ assertion may trigger an LED on the memory system board 66 indicating that a fault has been detected.

The over current limit is determined by the ratio of the RILIM resistor 110 to the RSENSE resistor 106. The voltage across the RSENSE resistor 106 is equal to:

$$VSENSE = ILOAD * RSENSE$$

where ILOAD is the load current supplied to the memory cartridge 58.

The RILIM resister 110, is charged by an internal 10 uA current source. The over current threshold voltage, VOCTH, across the RILIM resistor 110 is equal to:

$$VOCTH = 10 \, uA * RILIM$$

Both VSENSE and VOCTH are fed into an internal comparator in the power controller 76 (not illustrated). If VSENSE>VOCTH, the power controller 76 will enter the over current time out period. Thus the maximum load current, ILOAD, can be allowed is equal to:

$$ILOAD = \frac{10uA * RILIM}{RSENSE}$$

For RILIM=12K Ohm and RSENSE=0.01 Ohm, the maximum over current limit is 12A.

Figure 11:
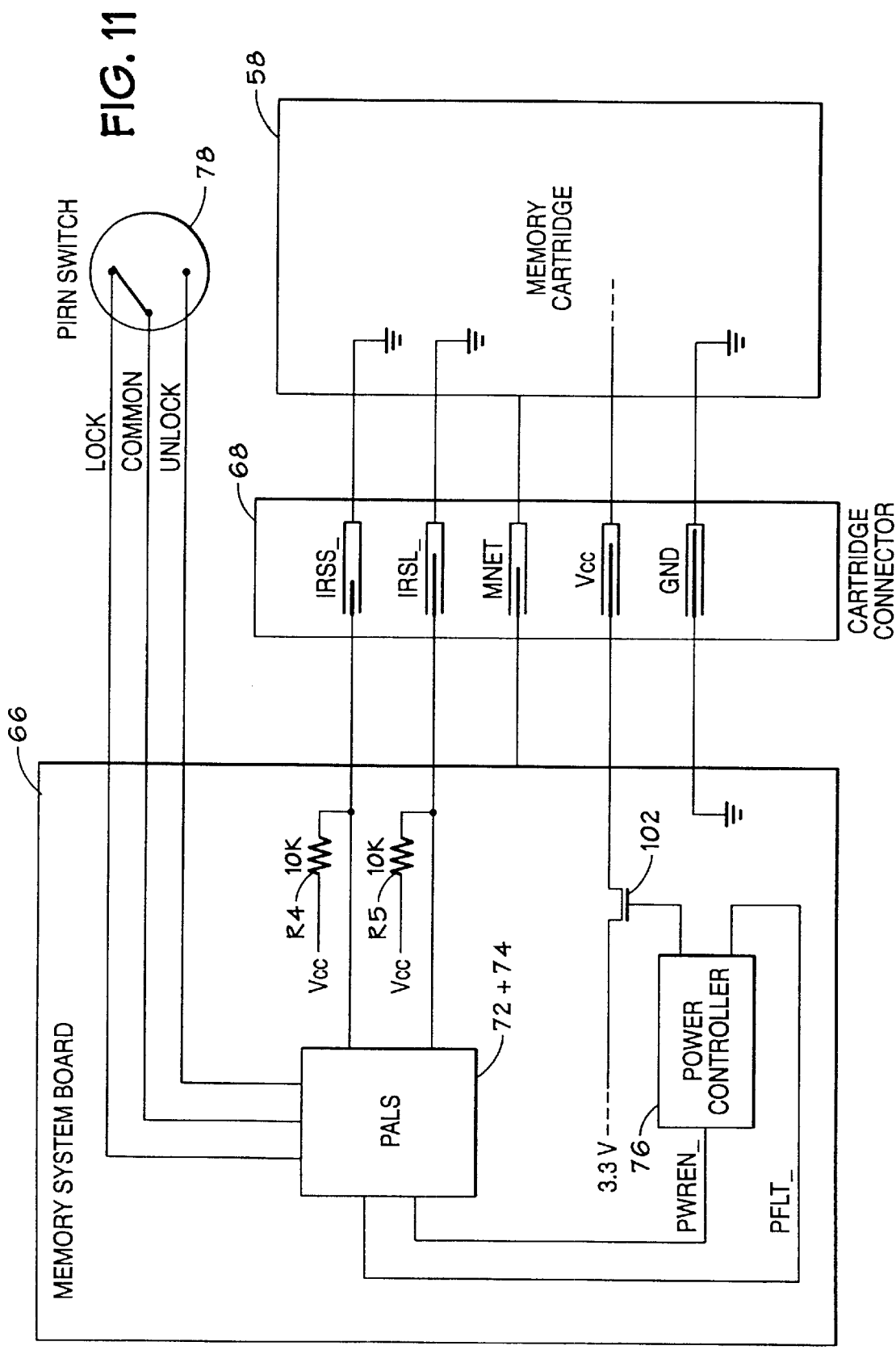
FIG. 11 illustrates a block diagram of the hot-plug interface for the present system.

FIG. 11 illustrates the hot-plug interface as described in FIGS. 4–10. The memory system board 66, a cartridge connector 68, and a memory cartridge 58 are illustrated. As previously discussed, the memory system board 66 includes a system PAL 72, a cartridge PAL 74 for each memory cartridge 58, and a power controller 76 for each memory cartridge 58. The cartridge connector 68, includes signal pins GND, VCC, MT, IRSL_, and IRSS_of varying pin lengths. Both the IRSS_signal and the IRSL_signal may be pulled high through pull-up resistors R4 and R5, respectively. Further, the PIRN switch 78 may provide a mechanism for locking the memory cartridge 58 into the cartridge connector 68. The lock position indicates that the memory cartridge 58 has been inserted into the cartridge connector 68 and is ready to be powered up. The unlock position indicates that the memory cartridge 58 is ready to be powered down and removed. The memory cartridge 58 can only be inserted or removed with the PIRN switch 78 in the unlock position. If the PIRN switch 78 is in the lock position, the memory cartridge is locked into the chassis and cannot be removed.

Figure 12:
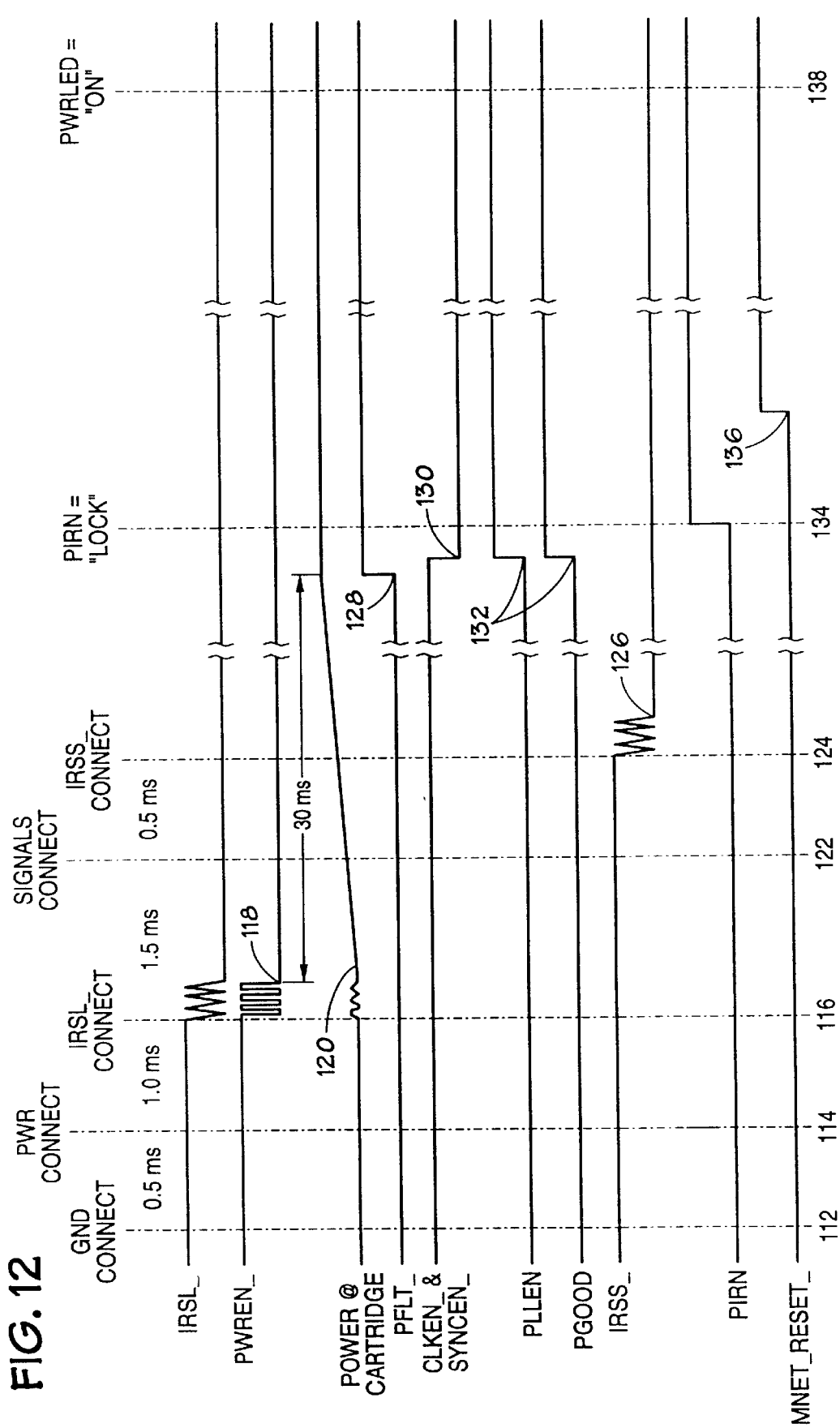
FIG. 12 is a timing diagram illustrating the sequence of events during the insertion of a memory cartridge from the memory sub-system, in accordance with the present technique.

The sequence of events during a normal insertion of the memory cartridge is shown in FIG. 12. It should be understood that the timing associated with the connection of the signal pins GND, VCC, MNET, IRS_, and IRSS_are only proximations. Initially, the host controller and host driver drives all MNET signals to "0". Further, the MNET_RESET_signal is active, the system clock SYSCLK is running and power to memory cartridge is off.

Sequence of Events:
1. GND pin connects, as indicated at 112.
2. PWR pin connects, as indicated at 114.
3. IRSL_pin connects, as indicated at 116.
4. The system PAL 72 asserts PD_to the host controller through the system PAL shift-in chain, as described with reference to Table 1.
5. The cartridge PAL 74 asserts PWREN_to the power controller 76, as indicated at 118 and described with reference to FIG. 9.
6. The power controller 76 soft starts the MOSFET 102, as indicated at 120 and as described with reference to FIG. 10.
7. Signal (MNET, SYSCLK, etc) pins connect, as indicated at 122.
8. IRSS_pin connects, as indicated at 124.
9. The cartridge PAL 74 asserts IRS_to the host controller through the cartridge shift-in chain, as indicated at 126 and described with reference to FIG. 8a.
10. The host controller generates an interrupt indicating a new memory cartridge has been installed.
11. Software Driver blinks PWRLED and ATTNLED once.
12. The power controller 76 de-asserts PFLT_when power to memory cartridge is greater than 2.8V, as indicated at 128 and discussed with reference to FIG. 10.
13. The system PAL 72 de-asserts PFLT_to the host controller through the system PAL shift-in chain, as described with reference to Table 1.
14. The cartridge PAL 74 asserts CLKEN_and SYNCEN_to enable the quick switches to connect SYSCLK and SYNCIN to the memory control device 64, as indicated at 130 and discussed with reference to FIG. 9.
15. The cartridge PAL 74 asserts PLLEN and PGOOD to the memory control device 64, as indicated at 132 and discussed with reference to FIG. 9.
16. User turns PIRN switch 78 from "unlock" to "lock" position, as discussed with reference to FIG. 7.
17. The cartridge PAL asserts PIRN to the host controller through the cartridge PAL shift-in chain, as indicated at 134 and discussed with reference to FIG. 8a.
18. The host controller generates an interrupt indicating a new memory cartridge is ready to power up.
19. S/W DRIVER blinks PWRLED.
20. The host controller de-asserts MNET_RESET_to the memory control device 64, as indicated at 136.
21. The host controller generates an interrupt indicating the power up sequence is complete.
22. Software Driver configures the memory control device 64 and initializes memory on the new memory cartridge 58.
23. Software Driver turns the PWRLED from "blink" to "on" indicating the new memory cartridge is fully functional, as indicated at 138.

The sequence of events during a normal removal of the memory cartridge 58 is shown in FIG. 13. It should be understood that the timing associated with the disconnection of the signal pins GND, VCC, MNET, IRSL_, and IRSS_ are only approximations. Initially, all MMET signals are active. Further, MNET_RESET_is inactive and the system clock SYSCLK is running. Power to memory cartridge 58 is on. The memory sub-system 56 is in redundant mode.

Sequence of Events:
1. User turns PIRN switch 78 to "unlock" position, as discussed with reference to FIG. 7.
2. The cartridge PAL 74 de-asserts PIRN to the host controller through the cartridge PAL shift-in chain, as indicated at 140 and discussed with reference to FIG. 8a.
3. The host controller generates an interrupt indicating the memory cartridge 58 is to be removed.
4. Software Driver executes the power down sequence.
5. Software Driver blinks the PWRLED.
6. The host controller asserts MNET_RESET_to the memory control device 64, as indicated at 142.
7. The memory control device 64 tri-states all of its buffers.
8. The host controller and host driver drive "0" on the MNET bus.
9. Software Driver turns off the PWRLED to indicate the memory cartridge 58 can be removed.
10. User removes the memory cartridge 58.
11. IRSS_pin disconnects, as indicated at 144.
12. The cartridge PAL 74 de-asserts IRS_to the host controller, as indicated at 146.
13. Signal (MNET, SYSCLK, etc) pins disconnect, as indicated at 148.
14. IRSL_pin disconnects, as indicated at 150.
15. The system PAL de-asserts PD_to the host controller through the system PAL 72 shift-in chain, as described with reference to Table 1.
16. The host controller generates an interrupt indicating the memory cartridge 58 has been removed.
17. The cartridge PAL 74 de-asserts PWREN_to the power controller 76, as indicated at 152.
18. The power controller 76 latches off the MOSFET 102 and asserts PFLT_as indicated at 154 and described with reference to FIG. 10.
19. The system PAL 72 asserts PFLT_to the host controller through the system PAL shift in-chain, as indicated at 156 and discussed with reference to FIG. 10.

20. The cartridge PAL 74 de-asserts CLKEN__ and SYNCEN__, as indicated at 158 and discussed with reference to FIG. 9.
21. SYSCLK and SYNCIN to the memory control device 64 are disconnected, as discussed with reference to FIG. 9.
22. The cartridge PAL 74 de-asserts PLLEN and PGOOD to the memory control device 64, as indicated at 160 and discussed with reference to FIG. 9.
23. PWR pin disconnects, as indicated at 162.
24. GND pin disconnects, as indicated at 164.

The sequence of events during an illegal removal of the memory cartridge 58 is shown in FIG. 14. Initially, all MNET signals are active. Further, MNET_RESET_ is inactive, and SYSCLK is running. The power to memory cartridge 58 is on. The memory sub-system 56 is in non-redundant mode.

Sequence of Event

1. User turns PIRN switch 78 to "unlock" position, as discussed with reference to FIG. 7.
2. The cartridge PAL 74 de-asserts PIRN to the host controller through the cartridge PAL shift-in chain, as indicated at 166 and discussed with reference to FIG. 8a.
3. The host controller generates an interrupt indicating the memory cartridge 58 is to be removed.
4. Software Driver asserts AUDIO_ALARM thru the system PAL 72 shift out chain, as discussed with reference to FIG. 7.
5. User removes the memory cartridge 58.
6. IRSS__ pin disconnects, as indicated at 168.
7. The cartridge PAL 74 de-asserts IRS__ to the host controller, as indicated at 146.
8. The system PAL de-asserts PD__ to the host controller through the system PAL 72 shift-in chain, as described with reference to Table 1.
9. Software Driver executes the power down sequence.
10. Software Driver blinks the PWRLED.
11. The host controller asserts MNET_RESET_ to the memory control device 64, as indicated at 170.
12. The memory control device 64 tri-states all of its buffers.
13. The host controller and host driver drive "0" on the MNET bus.
14. Signal (MNET, SYSCLK, etc) pins disconnect, as indicated at 172.
15. IRSL__ pin disconnects, as indicated at 174.
16. The system PAL de-asserts PD__ to host controller through the system PAL 72 shift-in chain, as described with reference to Table 1.
17. The host controller generates an interrupt indicating the memory cartridge 58 has been removed.
18. The cartridge PAL 74 de-asserts PWREN__ to the power controller 76, as indicated at 176.
19. The power controller 76 latches off the MOSFET 102 and asserts PFLT__, as indicated at 178 and described with reference to FIG. 10.
20. The system PAL 72 asserts PFLT__ to the host controller through the system PAL shift in-chain, as indicated at 180 and discussed with reference to FIG. 10.
21. The cartridge PAL 74 de-asserts CLKEN__ and SYNCEN__, as indicated at 182 and discussed with reference to FIG. 9.
22. SYSCLK and SYNCIN to the memory control device 64 are disconnected, as discussed with reference to FIG. 9.
23. The cartridge PAL 74 de-asserts PLLEN and PGOOD to the memory control device 64, as indicated at 184 and discussed with reference to FIG. 9.
24. PWR pin disconnects, as indicated at 186.
25. GND pin disconnects, as indicated at 188.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A computer system comprising:
   a host controller; and
   a memory sub-system coupled to the host controller and configured to operate in a redundant mode of operation an a non-redundant mode of operation, the memory sub-system comprising:
      a memory system board;
      a plurality of memory cartridges coupled to the system board and configured to store data;
      a plurality of cartridge connectors coupled to the memory system board, each of the plurality of cartridge connectors configured to receive one of the plurality of memory cartridges and further configure to facilitate the insertion and removal of the memory cartridges while the system is powered-up; and
      a plurality of control logic devices coupled to the memory system board and configured to facilitate the transition of the memory sub-system from the redundant mode of operation to the non-redundant mode of operation, and further configured to facilitate the transition of the memory sub-system from the non-redundant mode of operation to the redundant mode of operation, the plurality of control logic devices comprising:
         a first device programmed to facilitate the exchange of a first set of control signals between the host controller and the memory sub-system;
         a plurality of power control devices coupled to the first device and configured to provide power fault detection in the computer system; and
         a plurality of second devices coupled between the memory control device and the host controller and programmed to exchange a second set of control signals there between.

2. The computer system, as set forth in claim 1, wherein the host controller comprises error detection logic configured to detect errors in the data stored in the memory cartridges.

3. The computer system, as set forth in claim 1, wherein the host controller comprises a plurality of drivers configured to drive the plurality of control logic devices.

4. The computer system, as set forth in claim 1, wherein each of the plurality of memory cartridges comprises plurality of memory modules.

5. The computer system, as set forth in claim 4, wherein each of the plurality of memory cartridges comprises our memory modules.

6. The computer system, as set forth in claim 4, wherein each of the plurality of memory modules comprises a Dual Inline Memory Module (DIMM).

7. The computer system, as set forth in claim 4, wherein each of the plurality of memory modules comprises a plurality of memory devices configured to store data.

8. The computer system, as set forth in claim 7, wherein each of the plurality of memory devices comprises a Synchronous Dynamic Random Access Memory (SDRAM) device.

9. The computer system, as set forth in claim 1, wherein the memory sub-system comprises five memory cartridges.

10. The computer system, as set forth in claim 1, wherein each of the plurality of memory cartridges comprises a memory control device configured to control access to one of the plurality of memory cartridges.

11. The computer system, as set forth in claim 10, wherein each of the memory control devices comprises error detection logic configured to detect errors in the data stored in the plurality of memory cartridges.

12. The computer system, as set forth in claim 1, wherein each of the plurality of cartridge connectors comprises a plurality of pins of varying lengths.

13. The computer system, as set forth in claim 1, comprising a plurality of light emitting devices (LEDs) to indicate an insertion status of the memory cartridge.

14. The computer system, as set forth in claim 1, comprising a plurality of devices configured to provide an audio alarm for the memory sub-system, the alarm being activated in the event of an illegal memory cartridge removal.

15. The computer system, as set forth in claim 1, wherein the first device is a programmable array logic (PAL) device.

16. The computer system, as set forth in claim 1, wherein the first set of control signals comprise Present Detect signals, Power Fault signals, and Pre-Insertion Removal Notification Cable signals.

17. The computer system, as set forth in claim 1, wherein each of the plurality of power control devices is configured to facilitate a soft start of the memory cartridge.

18. The computer system, as set forth in claim 1, wherein each of the plurality of power control devices is configured to provide over-current protection for the memory cartridge.

19. The computer system, as set forth in claim 1, wherein each of the plurality of power control devices is configured to provide under-voltage protection for the memory cartridge.

20. The computer system, as set forth in claim 1, wherein each of the plurality of second devices comprises a programmable array logic (PAL) device.

21. The computer system, as set forth in claim 1, wherein the second set of control signals comprises a plurality of interrupt signals and a plurality of miscellaneous control signals.

22. A memory sub-system comprising:
a memory system board;
a plurality of memory cartridges coupled to the system board and configured to store data;
a plurality of cartridge connectors coupled to the memory system board, each of the plurality of cartridge connectors configured to receive one of the plurality of memory cartridges and further configured to facilitate the insertion and removal of the memory cartridges while the system is powered-up; and
a plurality of control logic devices coupled to the memory system board and configured to facilitate the transition of the memory sub-system from the redundant mode of operation to the non-redundant mode of operation, and further configured to facilitate the transition of the memory sub-system from the non-redundant mode of operation to the redundant mode of operation, the plurality of control logic devices comprising:
a first device programmed to facilitate the exchange of a first set of control signals between the host controller and the memory sub-system;
a plurality of power control devices coupled to the first device and configured to provide power fault detection in the computer system; and
a plurality of second devices coupled between the memory control device and the host controller and programmed to exchange a second set of control signals there between.

23. The computer system, as set forth in claim 22, wherein each of the plurality of memory cartridges comprises a plurality of memory modules.

24. The computer system, as set forth in claim 23, wherein each of the plurality of memory cartridges comprises four memory modules.

25. The computer system, as set forth in claim 23, wherein each of the plurality of memory modules comprises a Dual Inline Memory Module (DIMM).

26. The computer system, as set forth in claim 23, wherein each of the plurality of memory modules comprises a plurality of memory devices configured to store data.

27. The computer system, as set forth in claim 26, wherein each of the plurality of memory devices comprises a Synchronous Dynamic Random Access Memory (SDRAM) device.

28. The computer system, as set forth in claim 22, wherein the memory sub-system comprises five memory cartridges.

29. The computer system, as set forth in claim 22, wherein each of the plurality of memory cartridges comprises a memory control device configured to control access to one of the plurality of memory cartridges.

30. The computer system, as set forth in claim 29, wherein each of the memory control devices comprises error detection logic configured to detect errors in the data stored in the plurality of memory cartridges.

31. The computer system, as set forth in claim 22, wherein each of the plurality of cartridge connectors comprises a plurality of pins of varying lengths.

32. The computer system, as set forth in claim 22, comprising a plurality of light emitting devices (LEDs) to indicate an insertion status of the memory cartridge.

33. The computer system, as set forth in claim 22, comprising a plurality of devices configured to provide an audio alarm for the memory sub-system, the alarm being activated in the event of an illegal memory cartridge removal.

34. The computer system, as set forth in claim 22, wherein the first device is a programmable array logic (PAL) device.

35. The computer system, as set forth in claim 22, wherein the first set of control signals comprise Present Detect signals, Power Fault signals, and Pre-Insertion Removal Notification Cable signals.

36. The computer system, as set forth in claim 22, wherein each of the plurality of power control device is configured to facilitate a soft start of the memory cartridge.

37. The computer system, as set forth in claim 22, wherein each of the plurality of power control devices is configured to provide over-current protection for the memory cartridge.

38. The computer system, as set forth in claim 22, wherein each of the plurality of power control devices is configured to provide under-voltage protection for the memory cartridge.

39. The computer system, as set forth in claim 22, wherein each of the plurality of second devices comprises a programmable array logic (PAL) device.

40. The computer system, as set forth in claim 22, wherein the second set of control signals comprises a plurality of interrupt signals and a plurality of miscellaneous control signals.

41. A system configured to detect and protect a memory sub-system from failure mechanisms, the system comprising:

a first device programmed to facilitate the exchange of a first set of control signals between the host controller and the memory sub-system;

a plurality of power control devices coupled to the first device and configured to provide power fault detection in the computer system, and wherein each of the plurality of power control devices is configured to provide over-current protection for the memory cartridge; and a plurality of second devices coupled between the memory control device and the host controller and programmed to exchange a second set of control signals there between.

42. The computer system, as set forth in claim 41, comprising a plurality of light emitting devices (LEDs) to indicate an insertion status of the memory cartridge.

43. The computer system, as set forth in claim 41, comprising a plurality of devices configured to provide an audio alarm for the memory sub-system, the alarm being activated in the event of an illegal memory cartridge removal.

44. The computer system, as set forth in claim 41, wherein the first device is a programmable array logic (PAL) device.

45. The computer system, as set forth in claim 41, wherein the first set of control signals comprise Present Detect signals, Power Fault signals, and Pre-Insertion Removal Notification Cable signals.

46. The computer system, as set forth in claim 41, wherein each of the plurality of power control devices is configured to facilitate a soft start of the memory cartridge.

47. The computer system, as set forth in claim 41, wherein each of the plurality of power control devices is configured to provide under-voltage protection for the memory cartridge.

48. The computer system, as set forth in claim 41, wherein each of the plurality of second devices comprises a programmable array logic (PAL) device.

49. The computer system, as set forth in claim 41, wherein the second set of control signals comprises a plurality of interrupt signals and a plurality of miscellaneous control signals.

\* \* \* \* \*